(12) United States Patent
Cirino

(10) Patent No.: US 7,717,654 B2
(45) Date of Patent: May 18, 2010

(54) DRILL TIP WITH SERRATED AND DOWEL PINNED SHANK INTERFACE

(76) Inventor: Thomas J. Cirino, 9250 White Oak Rd., Kirtland, OH (US) 44094

( * ) Notice: Subject to any disclaimer, the term of this patent is extended or adjusted under 35 U.S.C. 154(b) by 585 days.

(21) Appl. No.: 11/441,663

(22) Filed: May 26, 2006

(65) Prior Publication Data

US 2007/0274795 A1 Nov. 29, 2007

(51) Int. Cl.
*B23B 51/00* (2006.01)
(52) U.S. Cl. .................. 408/233; 408/226; 408/713
(58) Field of Classification Search ......... 408/231–233, 408/144, 226, 227, 230, 713; *B23B 51/00, B23B 51/02*
See application file for complete search history.

(56) References Cited

U.S. PATENT DOCUMENTS

| | | | | |
|---|---|---|---|---|
| 932,071 | A * | 8/1909 | Urbscheit | 408/233 |
| 3,912,414 | A | 10/1975 | Fukura et al. | |
| 4,342,368 | A | 8/1982 | Denman | |
| 4,642,942 | A | 2/1987 | Guhring | |
| 4,684,298 | A * | 8/1987 | Roos | 408/59 |
| 4,856,944 | A * | 8/1989 | Reinauer | 408/59 |
| 4,861,673 | A | 8/1989 | Hara et al. | |
| 4,950,108 | A * | 8/1990 | Roos | 409/59 |
| 5,154,549 | A | 10/1992 | Isobe et al. | |
| 5,678,960 | A | 10/1997 | Just et al. | |
| 5,704,438 | A | 1/1998 | Kloppers et al. | |
| 5,800,101 | A | 9/1998 | Jindai et al. | |
| 5,863,162 | A * | 1/1999 | Karlsson et al. | 408/230 |
| 5,915,895 | A | 6/1999 | Jager et al. | |
| 6,146,060 | A * | 11/2000 | Rydberg et al. | 407/40 |
| 6,524,034 | B2 * | 2/2003 | Eng et al. | 408/59 |
| 6,582,164 | B1 | 6/2003 | McCormick | |
| 6,626,614 | B2 * | 9/2003 | Nakamura | 408/59 |
| 6,685,402 | B2 | 2/2004 | Mast et al. | |
| 6,688,817 | B2 | 2/2004 | Borschert et al. | |
| 6,719,074 | B2 | 4/2004 | Tsuda et al. | |
| 2002/0139587 | A1 | 10/2002 | Mast et al. | |
| 2003/0039523 | A1 * | 2/2003 | Kemmer | 408/231 |
| 2004/0179913 | A1 | 9/2004 | Mast et al. | |
| 2004/0208716 | A1 | 10/2004 | Krenzer | |
| 2004/0223823 | A1 | 11/2004 | Mast et al. | |

FOREIGN PATENT DOCUMENTS

| | | | |
|---|---|---|---|
| DE | 1006005879 B3 | * | 7/2007 |
| EP | 358901 A1 | * | 3/1990 |
| GB | 2299961 A | * | 10/1996 |
| JP | 2005161462 A | * | 6/2005 |

* cited by examiner

*Primary Examiner*—Daniel W. Howell
(74) *Attorney, Agent, or Firm*—Roeztel & Andress

(57) ABSTRACT

A replaceable drill tip and drill shank combination has a serrated and dowel pinned drill tip and drill shank interface, wherein the drill tip has a serrated bottom surface and a channel for receiving a dowel pin which extends axially from a drill shank, the drill shank having a serrated distal end which engages with the serrations in the bottom surface of the drill tip, and fasteners which extend through the drill tip into the drill shank.

26 Claims, 6 Drawing Sheets

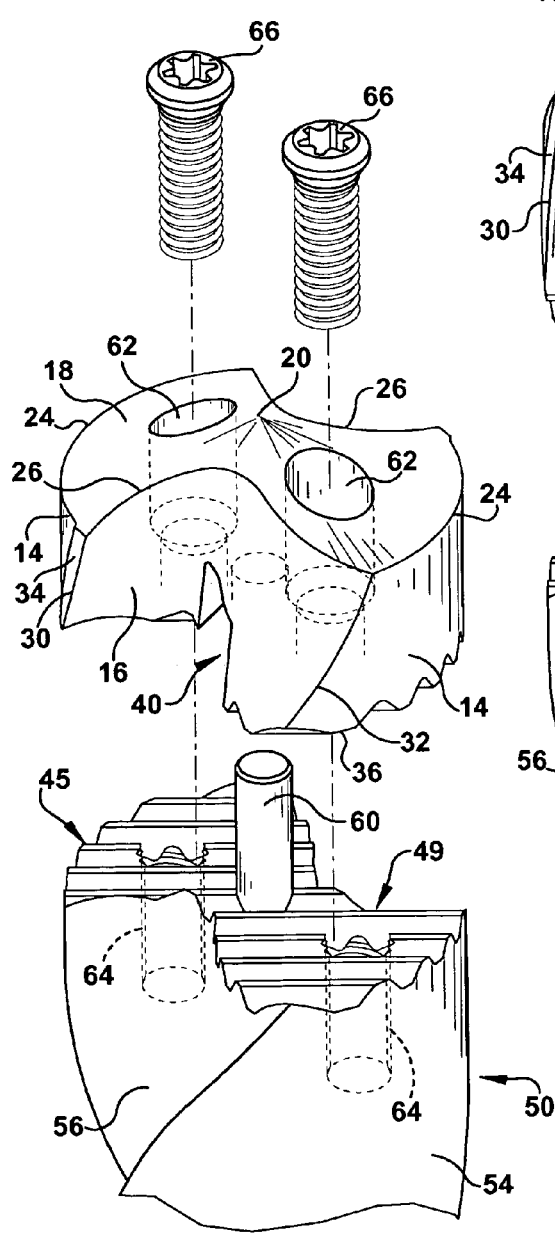
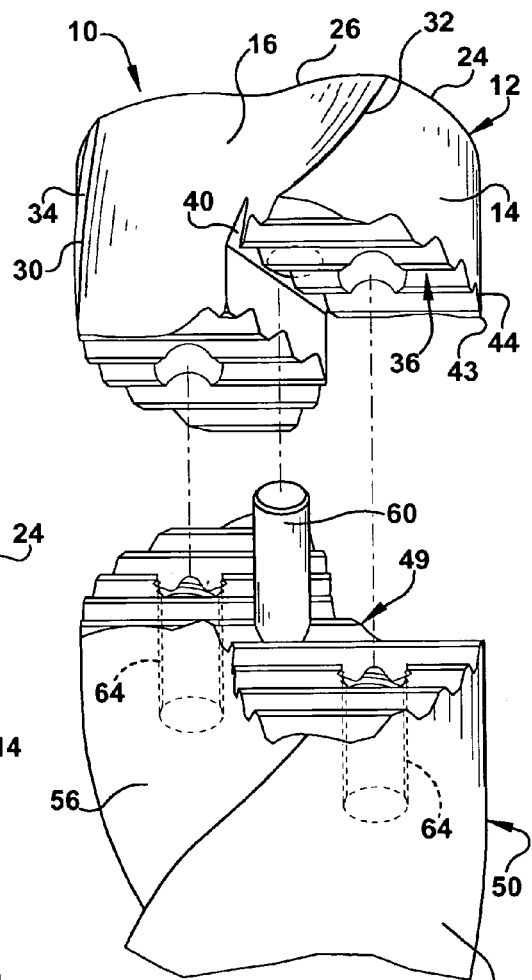
Fig. 1
Fig. 2

DRILL TIP WITH SERRATED AND DOWEL PINNED SHANK INTERFACE

FIELD OF THE INVENTION

The present disclosure is in the general field of machinery and drilling tools.

BACKGROUND OF THE INVENTION

Replaceable drill tips and cutting inserts are used in connection with various bits, shanks and tool holding apparatus in machine tooling for metal working. Replaceable tips eliminate the need to replace and exchange entire tools in continuous drilling and milling operations. For speed and efficiency, the manner of connection of replaceable tips with the holder or shank must be relatively simple, yet extremely rigid and strong to withstand the forces of moving metal-to-metal contact. The manner of engagement with a cutting or milling tip with the tool holder is somewhat dependent on the configuration of the cutting tip. In the case drill tips, there is typically a generally cylindrical drill shank with a distal end to which a tip is attached, so there is abutment of two circular faces of the tip and shank and very high torsional and lateral forces at the interface.

On a drill bit of this type, a cutting head is detachable fixed to a drill shaft. German Patent No. 196 05157 A1 describes a drilling tool of the prior art in which the cutting head projects by means of a stud into a receiving recess on the face of the drill shaft, where it is fixed in position with a screw that is oriented at a right angle to the longitudinal axis of the drill. On a drilling tool of the prior art described in TWO 98/53943, the drilling head is fixed in position in the drill shaft with a free fit that acts in the axial direction and in the direction of rotation of the drill.

A weakness of the prior art is in the strength and alignment of the attachment mechanism between drilling and cutting tips and the tool holder or shank. An attachment design which affords perfect alignment and positioning and which has sufficient strength is very desirable.

SUMMARY OF THE INVENTION

In accordance with one aspect of the disclosure, there is provided a drill tip having generally opposed actuate sides and generally opposed helical flutes between the actuate sides, a tapered boring surface which extends from an apex on a central axis of the body to edges of the actuate sides and the flutes, a bottom surface of the body generally opposite the boring surface, the bottom surface having a channel which runs perpendicular to and intersects the longitudinal axis of the body, and a plurality of serrations which are not aligned with the channel.

In accordance with another aspect of the disclosure, there is disclosed as a representative embodiment, a drill tip and drill shank combination wherein the drill tip has a body with two generally opposed actuate sides and two generally opposed flutes between the actuate sides, a boring surface which extends from an apex to intersections with the actuate sides and flutes, and a bottom surface generally opposite the boring surface, the bottom surface having a plurality of parallel linear serrations, and a linear channel which extends across the bottom surface of the body in a direction which is not parallel with the plurality of serrations, and the drill shank has an elongate form with two generally opposed actuate sides and two generally opposed flutes between the actuate sides which are dimensioned to align with the actuate sides and flutes of the drill tip, a distal end which has a plurality of parallel serrations configured to engage with the plurality of serrations of the drill tip, and a dowel pin generally aligned with a longitudinal axis of the drill shank and which extends beyond the distal end of the drill shank and into the channel in the drill tip when the serrations of the drill tip are engaged with the serrations of the drill shank.

These and other aspects and principles of the disclosure are described as representative examples of the design concepts and principles in the following detailed description.

DESCRIPTION OF THE DRAWINGS

FIG. 1 is a perspective view of a serrated and pinned drill tip and drill shank interface of the disclosure;

FIG. 2 is another perspective view of a serrated and pinned drill tip and drill shank interface of the disclosure;

DETAILED DESCRIPTION OF PREFERRED AND ALTERNATE EMBODIMENTS

Figure 4:
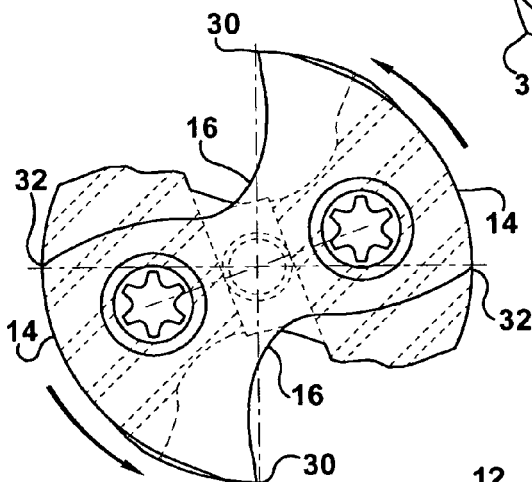
FIG. 4 is an end view of the drill tip of FIG. 3, in the direction of the arrows 4-4 in FIG. 3.
Figure 6:
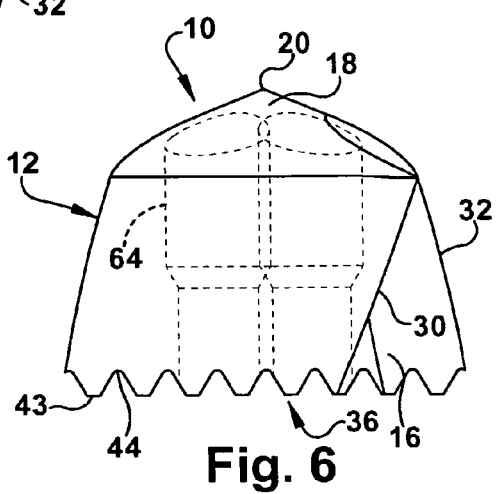
FIG. 6 is a profile view of the drill tip of FIG. 3, in the direction of the arrows 6-6 in FIG. 3.
Figure 7:
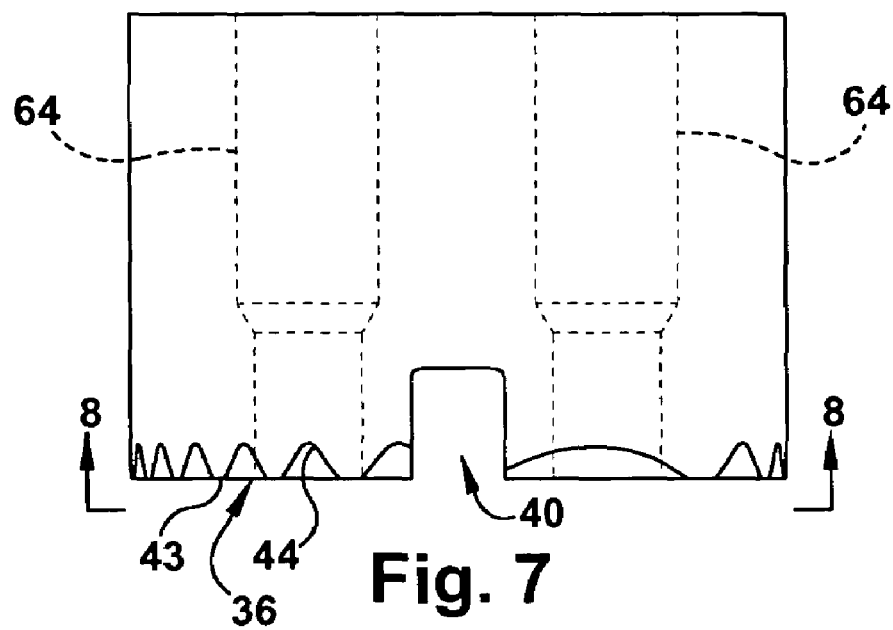
FIG. 7 is a profile view of a machine tool tip of the disclosure.
Figure 8:
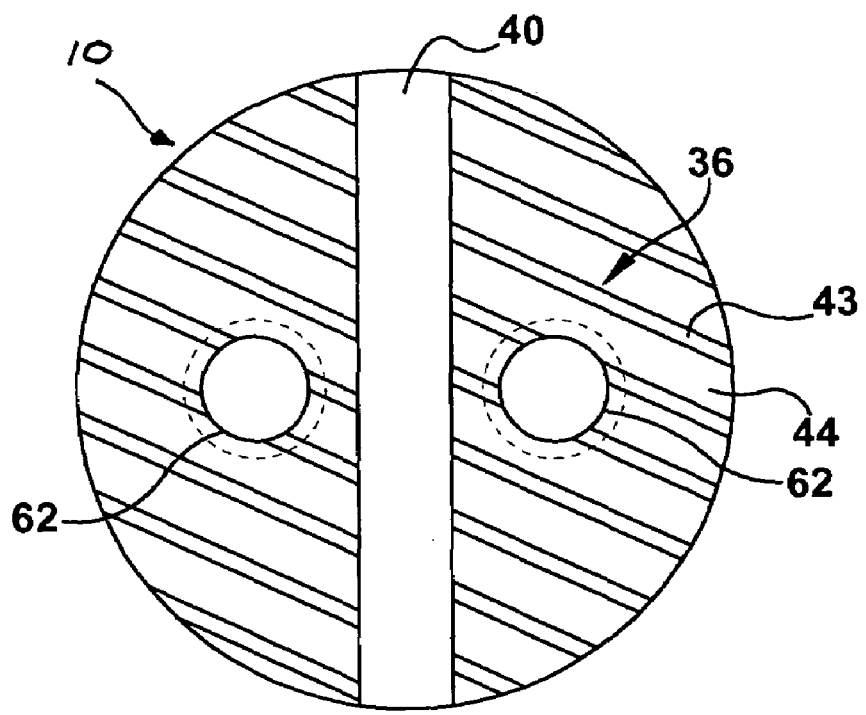
FIG. 8 is an end view of the machine tool tip of FIG. 7, in the direction of the arrows 8-8 in FIG. 7.

FIGS. 1 and 2 illustrate an exchangeable drill tip 10 in combination with a shank 50, such as a drill shank or other shank of a machine tool. Although illustrated as a drill tip, the principles and concepts of the invention are equally applicable to all types of shank-mounted machine tools and bits, as further described. The drill tip 10 has a body 12 which in this particular form has a generally cylindrical configuration with generally opposed actuate sides 14 and generally helical chip flutes ("flutes") 16 disposed radially and hectically between the helical actuate sides 14. The radially opposed and helical actuate sides 14 and flutes 16 define a bowie axial profile to the drill tip 10 and shank 50, as shown for example in FIGS. 4 and 5.

The drill tip 10 has a boring surface 18 which extends from an apex point 20 to upper edges 24 of the actuate sides 14 and upper edges 26 of the flutes 16. The boring surface 18 can have multiple surfaces 181, 182, the angles of which may vary, as measured relative to a longitudinal axis of the drill tip 10. In one embodiment, an interface of the multiple surfaces 181, 182 forms a ridge line 183 on the boring surface 18.

The actuate sides 14 and flutes 16 intersect at edge 30 which extends from the boring surface 18 to a bottom surface 36 of the drill tip 10. The edge 30 can be configured to function as a milling cutting edge ("leading edge 30") in several respects with the drill tip 10 rotated about its longitudinal axis in the direction indicated in FIG. 4. The trailing edge 32 is at the opposite side of flute 16 at the intersection with actuate side 14. The leading edge 30 may be formed with a chambered cutting edge 34 which improves the milling function of the drill bit 10. The chambered edge 32 may be formed at one or both of the leading edges 30.

As shown in FIGS. 3, 5, 7 and 8, a channel 40 is formed in the bottom 34 of the drill tip 10 and is oriented to extend transversely across the body 12 perpendicular to the longitudinal axis of the drill tip 10. In one form the channel 40 extends from the surface of one flute 16 across the bottom 36 to the surface of the opposing flute 16. However, different orientations of the channel are possible. The depth of the channel 40 along the longitudinal axis may be varied according to the total axial length of the drill tip 10.

Figure 3:
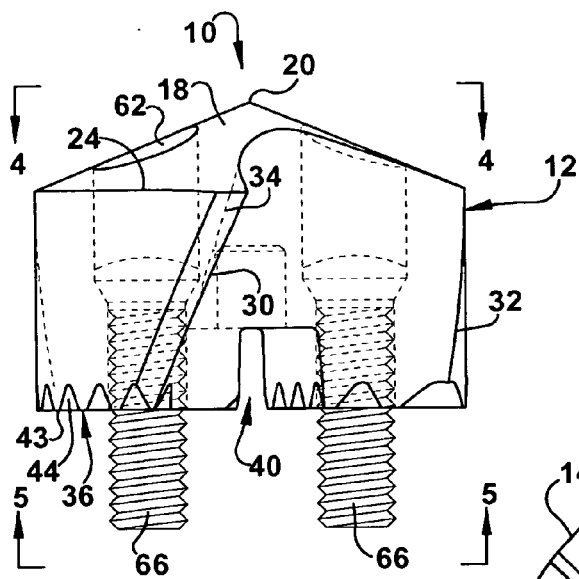
FIG. 3 is a profile view of a drill tip of the disclosure.
Figure 5:
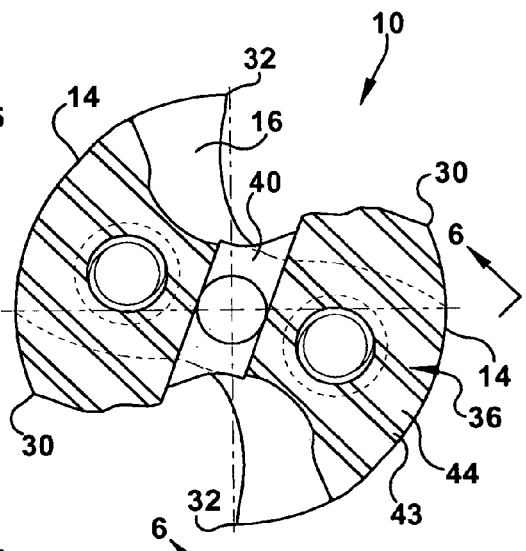
FIG. 5 is an end view of the drill tip of FIG. 3, in the direction of the arrows 5-5 in FIG. 3.

With further reference to FIGS. 2 and 5, the bottom 36 of the drill tip 10 is formed with a plurality of serrations 42, such as a series or set of teeth or notches and/or grooves, which as shown are arranged in parallel and extend across the bottom 36 of the drill tip 10. In this particular form, the serrations 42 extend generally from one actuate surface 14 to the opposing actuate surface 14, and intersect the channel 40. In other words, the serrations 42 are not parallel to the channel 40 and vice versa. In the embodiment shown, the serrations 42 and channel 40 are at a relative angle in an approximate but not limited range of 20 to 60 degrees, and in fact can be arranged at any relative angle so long as they are not exactly parallel or aligned, i.e. At 0 degrees.

The serrations 42, including ridges 43 and valleys 44 are configured to fit with corresponding parallel serrations 45 (including ridges 46 and valleys 47) formed on an end 49, such as a distal end of shank 50. The engagement of serrations 42 and 45 prevents any shifting or lateral movement of the drill tip 10 relative to the shank 50 in any direction other than the aligned direction of serrations 42, 45. Helical flutes 56 are formed in the shank 50 to hectically align with flutes 16 in drill tip 10 when the drill tip 10 is positioned on the drill shank 50 with the serrations 42 and 45 engaged. Similarly, actuate sides 54 are formed on the drill shank 50, intermediate flutes 56, to hectically align with the actuate sides 14 of the drill tip 10 when engaged with the drill shank 50.

A dowel pin 60 protrudes from end 49 of shank 50, through serrations 45 and aligned with longitudinal axis of the shank 50. The extent of the dowel pin 60 past the serrations 45 in end 49 of shank 50 is approximately equal to or less than a depth of channel 40, so that the dowel pin 60 extends into channel 40 when the serrations 42 and 45 are engaged with the drill tip 10 in position upon shank end 49 and axially aligned with shank 50. The presence of the dowel pin 60 within channel 40 prevents any shifting or lateral movement of the drill tip 10 relative to the shank 50 along the engaged serrations 42, 45. By the engagement combinations of the serrations 42 and 45, and dowel pin 60 within channel 40, lateral movement of the drill tip 10 relative to the shank 50 is prevented in any direction.

The drill tip 10 is axially secured to the shank 50 by fasteners 66 which are installed through through-bores 62 in the drill tip 10 which are aligned with taps 64 in the end 49 of shank 50 with the drill tip 10 in the installed position upon the shank 50.

Figure 9:
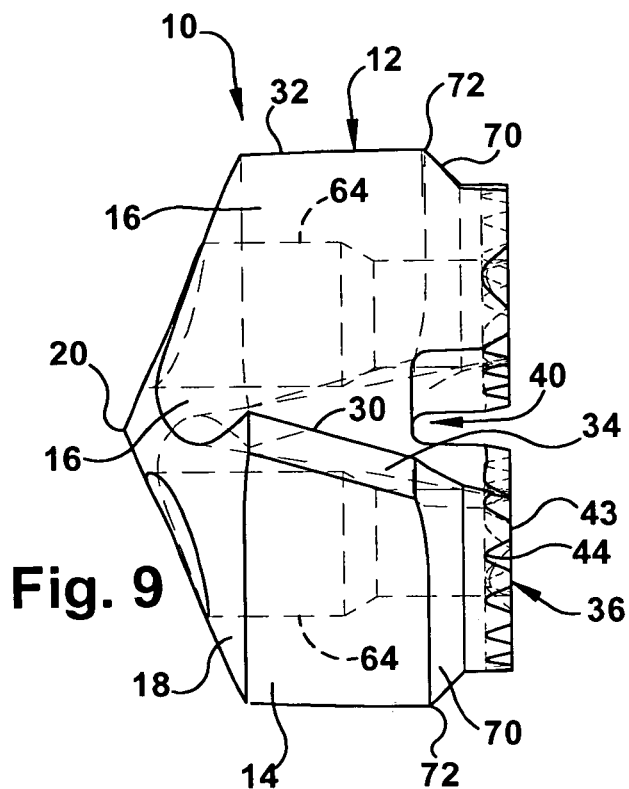
FIG. 9 is a profile view of an alternate embodiment of a machine tool tip of the disclosure.

FIG. 9 illustrates an alternate embodiment of a drill tip 10 with the same general configuration as those previously described, but further having a back chafer 70 around substantially the circumference of the body 12, and extending from the actuate sides 14 to the bottom surface 36. The back chafer 70 is highly effective in cleaning and finishing brings as the edge 72 between the chafer 70 and actuate sides 14 provides an additional cutting and polishing contact. The back chafer 70 can be incorporated into any of the drill tip designs of the disclosure.

Figure 10A:
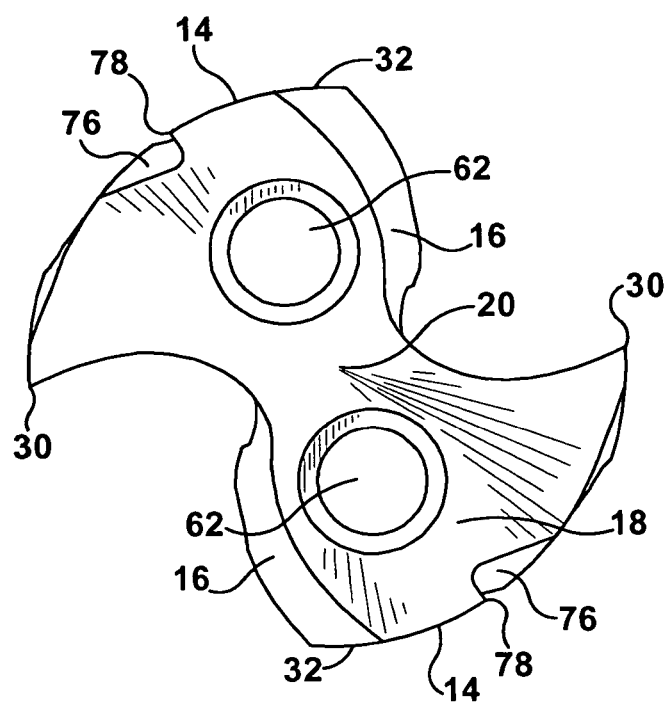
FIGS. 10A, 10B, and 10C are end, profile and perspective views, respectively, of an alternate embodiment of the machine tool tip of the disclosure.
Figure 10B:
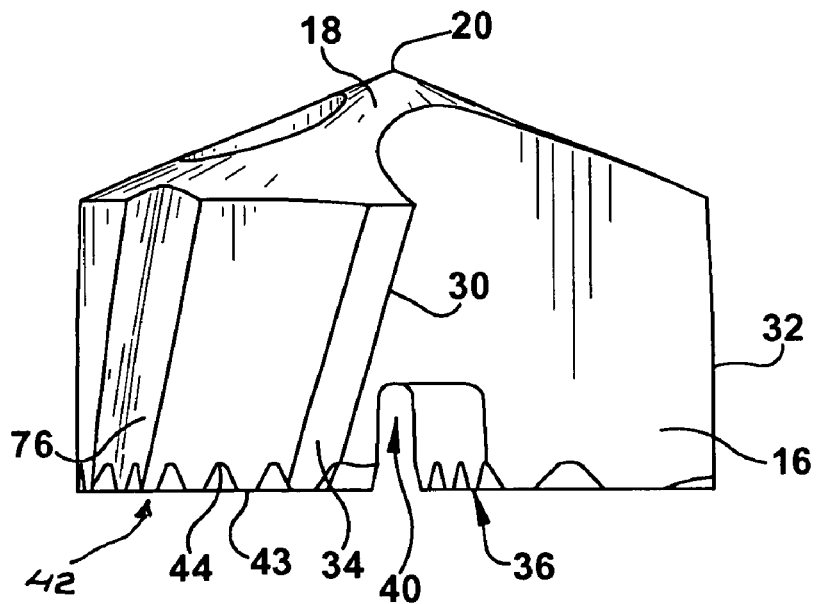
Figure 10C:
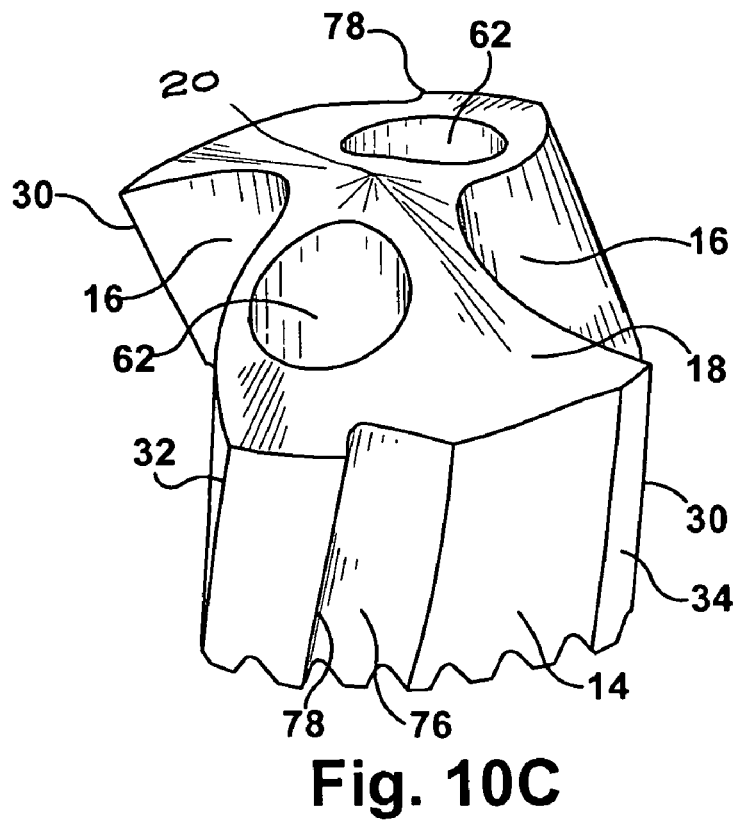

FIGS. 10A-10C illustrate a further variation of a drill tip 10 similar to those previously described but with the addition of double margin flutes 76 formed in the actuate sides 14 intermediate the helical flutes 16. The double margin flutes 76 provide, in combination with the leading edges 30 of flutes 16, four point cutting/boring contact by the action of the additional cutting lines 78 formed at the intersection with the actuate sides 14 and are highly effective in burnishing and polishing interior surfaces of brings, particular with aluminum or cast iron. The double margin flutes 76 are preferably formed on radially opposite sides of the drill tip 10 and follow a helical or angularly swept path as shown.

Figure 11:
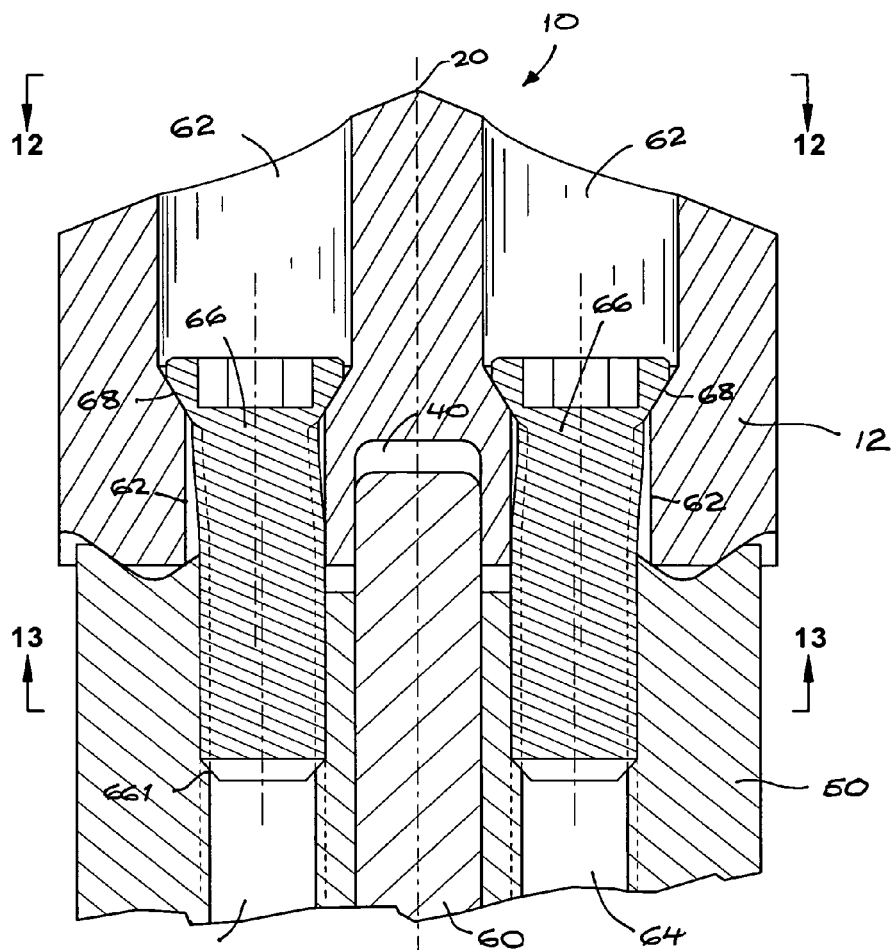
FIG. 11 is a cross sectional view showing the arrangement of the fasteners.
Figure 12:
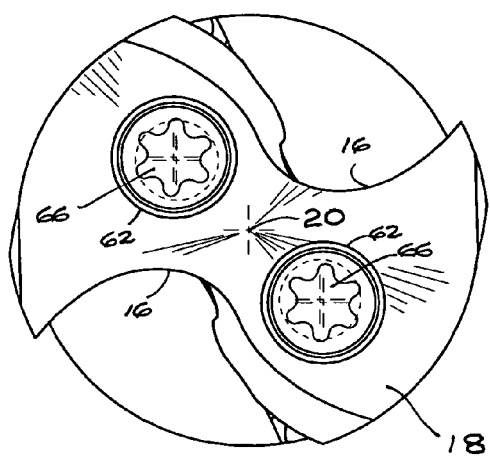
FIG. 12 is an end view of the tip and fasteners.
Figure 13:
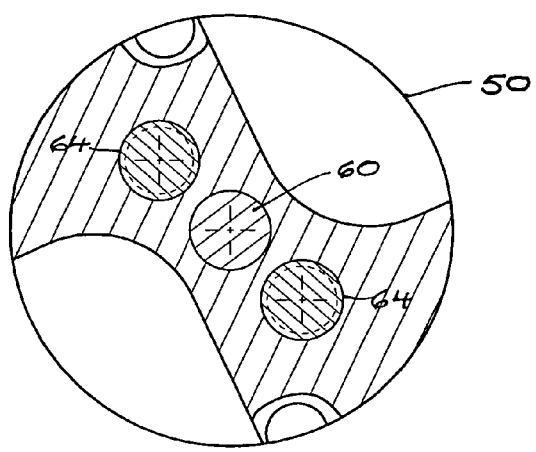
FIG. 13 is a cross sectional view of the shank and fasteners.

FIGS. 11-13 illustrate a further embodiment of the replaceable drill tip of the disclosure wherein a central longitudinal axis of the through-bores 62 in the drill tip 10 are not aligned with a central longitudinal axis of the corresponding taps 64 in the drill shank 50. Stated alternatively, the longitudinal axes of the through-bores 62 are located at a greater radius from the central longitudinal axis of the drill tip 10 than the longitudinal axes of the tips 64, with the longitudinal axes of the drill tip 10 and shank 50 aligned. As illustrated, chambered ends 661 of fasteners 66 distort the fasteners 66 from alignment with the through-bores 62 to alignment with the corresponding taps 64, creating a laterally binding engagement of the drill tip 10 with the shank 50, in combination with the respective engaged serrations 42 and 45 and creating lateral pressure against the segment of the dowel pin 60 within channel 40 in the drill tip 10. The miss-alignment of the through-bores 62 with the taps 64 prevents the fasteners 66 from loosening from vibration and further maintains perfect axial alignment of the drill tip 10 with the shank 50.

| Key to Reference Numerals | |
|---|---|
| 10 | drill tip |
| 12 | drill tip body |
| 14 | arcuate sides |
| 16 | flutes |
| 50 | drill shank |
| 20 | apex |
| 18 | boring surface |
| 181 | first boring surface |
| 182 | second boring surface |
| 183 | ridge line |
| 24 | upper edges of arcuate sides |
| 30 | leading edges at intersection of arcuate sides w/flutes |
| 32 | trailing edge |
| 34 | chamfered edge at edge 30 |
| 36 | bottom surface of drill tip |
| 40 | channel |
| 42 | serrations |
| 43 | serration ridges |
| 44 | serration valleys |
| 45 | drill shank serrations |
| 46 | drill shank serration ridges |
| 47 | drill shank serration valleys |
| 49 | distal end of drill shank 50 |
| 54 | arcuate sides to drill shank 50 |
| 56 | flutes in drill shank 50 |
| 60 | dowel pin |
| 62 | through-bores in drill tip |
| 64 | taps in drill shank |
| 66 | fasteners |
| 68 | screw seats in the though-bores |

The invention claimed is:

1. A drill tip having generally opposed actuate sides and generally opposed helical flutes between the actuate sides, a tapered boring surface which extends from an apex on a central axis of the body to edges of the actuate sides and the flutes, a bottom surface of the body generally opposite the boring surface, the bottom surface having a channel which runs perpendicular to and intersects the longitudinal axis of the body, and a plurality of serrations which are not aligned with the channel.

2. The drill tip of claim 1 in combination with a drill shank having actuate sides and flutes between the actuate sides which are generally aligned with the actuate sides and flutes of the drill tip;

a distal end of the drill shank having a surface generally orthogonal to a longitudinal axis of the drill shank with a plurality of serrations engaged with the serrations of the drill tip, and a dowel pin aligned with the longitudinal axis of the drill shank and extending from the distal end of the drill shank and into the channel in the body of the drill tip.

3. The drill tip and drill shank combination of claim 2 wherein the drill tip further comprises two through-bores in the body parallel to the longitudinal axis of the drill tip, and the drill shank includes taps aligned with the through-bores in the drill tip, and fasteners which extend through the through-bores and into the taps.

4. The drill tip of claim 1 further comprising cutting edges at the intersections of the boring surface and the flutes.

5. The drill tip of claim 1 further comprising a milling edges at the intersections of the actuate surfaces and the flutes.

6. The drill tip of claim 1 wherein the boring surface further comprises a first surface at a first angle relative to the longitudinal axis of the drill tip and a second surface at a second angle relative to the longitudinal axis of the drill tip.

7. The drill tip of claim 1 wherein the serrations extend between the actuate surfaces.

8. The drill tip of claim 1 wherein the serrations are arranged at an angle relative to the channel in the body in an approximate range of 5 degrees to 175 degrees.

9. The drill tip of claim 3 wherein the through-bores further comprise screw seats.

10. The drill tip of claim 3 wherein the channel is located between the through-bores.

11. The drill tip of claim 1 wherein the serrations extend between the actuate slots.

12. The drill tip of claim 1 wherein the channel extends into the body a distance approximately one fourth a height of the drill tip as measured from the bottom surface to the apex.

13. The drill tip of claim 1 wherein the plurality of serrations in the bottom surface of the body are parallel.

14. The drill tip of claim 1 further comprising a back chafer.

15. A drill tip and drill shank combination wherein the drill tip has a body with two generally opposed actuate sides and two generally opposed flutes between the actuate sides, a boring surface which extends from an apex to intersections with the actuate sides and flutes, and a bottom surface generally opposite the boring surface, the bottom surface having a plurality of parallel linear serrations, and a channel which extends across the bottom surface of the body in a direction which is not parallel with the plurality of serrations, and the drill shank has an elongate form with two generally opposed actuate sides and two generally opposed flutes between the actuate sides which are dimensioned to align with the actuate sides and flutes of the drill tip, a distal end which has a plurality of parallel serrations configured to engage with the plurality of serrations of the drill tip, and a dowel pin generally aligned with a longitudinal axis of the drill shank and which extends beyond the distal end of the drill shank and into the channel in the drill tip when the serrations of the drill tip are engaged with the serrations of the drill shank.

16. The drill tip and drill shank combination of claim 15 further comprising one or more through-bores in the drill tip which are aligned with taps in the distal end of the drill shank, and fasteners which extend through the one or more through-bores into the tap holes in the distal end of the drill shank.

17. The drill tip and drill shank combination of claim 15 wherein the drill tip has a cutting edges at the intersections of the boring surface and the flutes.

18. The drill tip and drill shank combination of claim 15 wherein the drill tip has milling edges at the intersections of the actuate surface and the flutes.

19. The drill tip and drill shank combination of claim 15 wherein the boring surface has a first surface at a first angle relative to a longitudinal axis of the drill tip and a second surface at a second angle relative to a longitudinal axis of the drill tip.

20. The drill tip and drill shank combination of claim 15 wherein the serrations of the drill tip extend between the actuate sides.

21. The drill tip and drill shank combination of claim 15 wherein the serrations of the drill tip are oriented at an angle relative to the channel in an approximate range of 5 to 175 degrees.

22. The drill tip and drill shank combination of claim 15 wherein the through-bores in the drill tip have screw seats.

23. The drill tip and drill shank combination of claim 15 wherein the channel is located between the through-bores.

24. The drill tip and drill shank combination of claim 15 wherein the dowel pin is generally aligned with a longitudinal axis of the drill tip.

25. The drill tip and drill shank combination of claim 15 wherein the drill tip comprises a back chafer.

26. The drill tip and drill shank combination of claim 16 wherein the through-bores in the drill tip are not aligned with the taps in the distal end of the drill shank, and the fasteners extend from the through-bores in the drill tip into the respective taps in the drill shank.

* * * * *